July 20, 1965　　　　G. D. SCHNEIDER　　　　3,196,105
SEWAGE DISPOSAL SYSTEM AND METHOD
Filed April 30, 1962
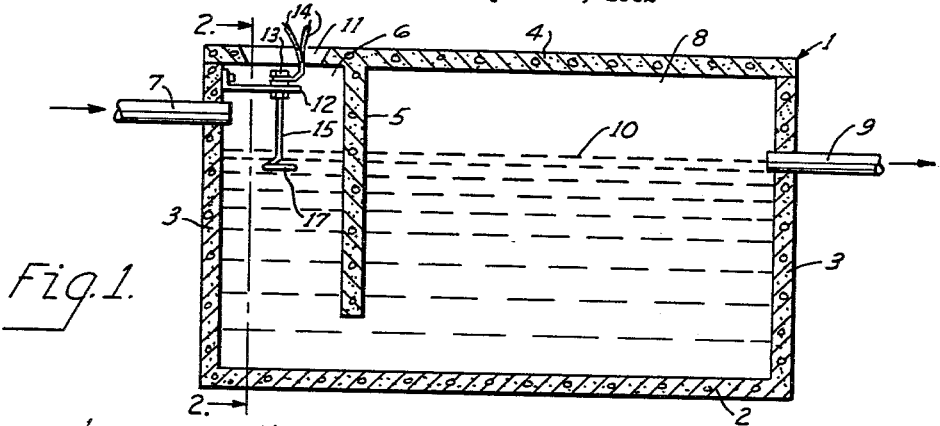
Fig. 1.
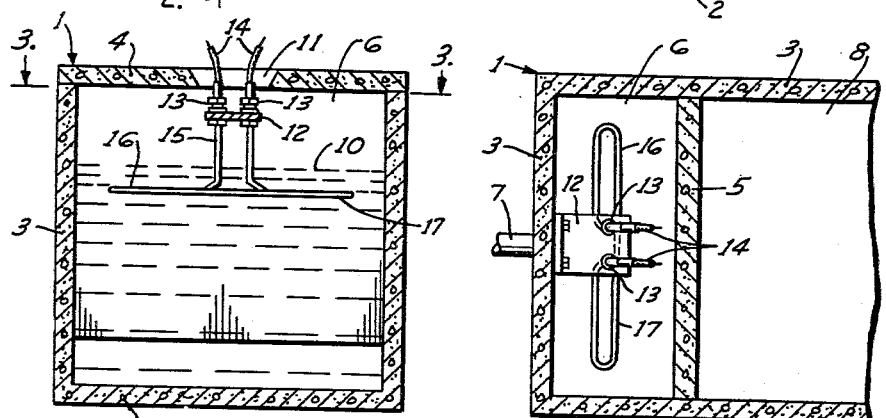
Fig. 2.　　Fig. 3.
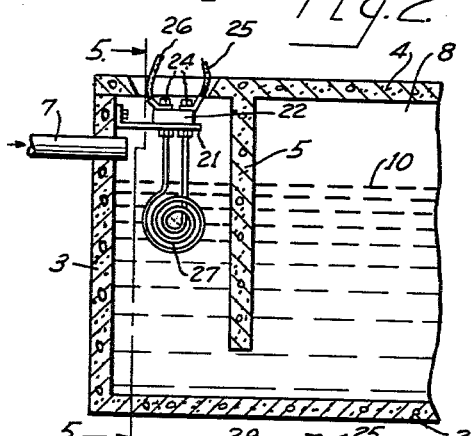
Fig. 4.
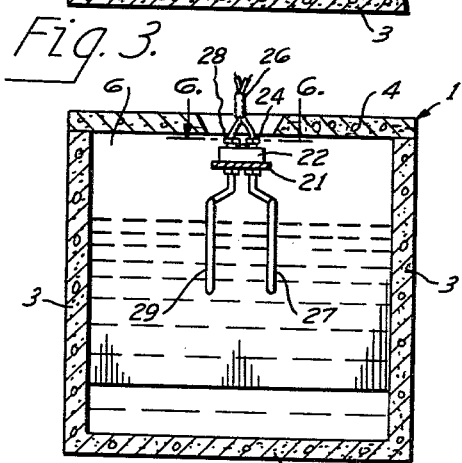
Fig. 5.
Fig. 6.
INVENTOR.
GILBERT D. SCHNEIDER
BY Bosworth, Sessions,
Herrstrom & Knowles
ATTORNEYS.

Patent text

3,196,105
SEWAGE DISPOSAL SYSTEM AND METHOD
Gilbert D. Schneider, Lexington, Ohio
Filed Apr. 30, 1962, Ser. No. 190,989
4 Claims. (Cl. 210—12)

This invention relates to a sewage disposal system employing a closed digestion tank and especially to processes and apparatus that may be used therewith for the purpose of dissipating the thick blanket of scum that sometimes forms in such a tank.

Even in an underground digestion tank, one example of which is the ordinary septic tank, climatic conditions tend at times to interfere with the operation of the tank, particularly in winter. Whereas warm weather generally makes for efficient operation of the tank, cold weather, the effect of which is felt most often at or near the top of the tank, militates against the beneficent action of bacteria colonies inhabiting the liquid contents of the tank immediately below the air-liquid interface. It can be demonstrated that bacterial activity in this zone is sharply inhibited by low temperatures.

In winter, particularly in parts of the country in which snow is common, a thick blanket of scum tends to form, float and persist for long periods of time on and in the vicinity of the surface of the liquid contents of the tank, apparently in consequence of this inhibitory action. Under some conditions this blanket of scum may be dense enough and extensive enough to interfere with the inflow of raw sewage into the tank, the outflow of effluent from the tank, or both. More often, the system as a whole operates on a less efficient basis, as evidenced among other things by the generation of obnoxious gases, notably hydrogen sulphide, by a partial failure to digest cellulosic materials present in the sewage, and by attendant clogging of the filter bed.

The present invention has for its principal object to provide processes and apparatus for dissipating this thick blanket of scum by introducing a limited amount of heat into the system, especially during the fall, winter and spring seasons.

In many cases, it is impracticable to heat the entire liquid contents of a digestion tank to something approaching the most favorable operating temperature, which ordinarily is likely to be in the range between about 100° and about 150° F. Overlooked in the past is the fact that it may be sufficient, in order to activate beneficent bacteria, to supply heat only in a circumscribed zone and mainly to the portion of th liquid contents of the tank lying immediately below the air-liquid interface. The present invention, which operates on this principle, has shown that even in the winter season it is feasible to activate beneficent bacteria and thereby to dissipate a thick blanket of scum that covers a relatively large area by supplying heat, over a circumscribed area, to the top few inches of the liquid contents of the tank.

Other objects, advantages and features of the invention will be apparent from the description which follows and from the accompanying drawings, in which:

FIGURE 1 is a longitudinal vertical section through a septic tank in which the features of the invention are employed.

FIGURE 2 is a transverse vertical section on line 2—2 of FIGURE 1.

FIGURE 3 is a plan seen as if from line 3—3 of FIGURE 2.

FIGURES 4 and 5 are sections similar to FIGURES 1 and 2 illustrating a modification.

FIGURE 6 is an enlarged detail seen as if from line 6—6 of FIGURE 5.

In FIGURE 1 the tank generally is designated 1. It has the usual bottom 2, walls 3, and baffle 5, all of concrete. Baffle 5 divides tank 1 into two chambers; viz., a small inlet chamber 6 into which raw sewage is discharged through conduit 7 and a large outlet chamber 8 in communication with a conduit 9 through which the effluent is discharged. The location of the latter conduit determines the height of liquid level 10. The layer of scum previously referred to tends to form and build up immediately above the air-liquid interface. Any layer of more than merely nominal thickness will interfere to some extent with the operation of the system as a whole.

In top 4 of tank 1 an access opening 11 is provided directly above inlet chamber 6. Disposed in inlet chamber 6 below the level of access opening 11 is a right-angled bracket 12 a portion of which is affixed to one of the walls 3 of tank 1. Bracket 12 positions and supports two binding posts 13, two electrical leads 14, and a heating unit 15. In the embodiment of the invention shown in FIGURES 1 to 3, the latter includes an elongated resistance coil of but a single turn, such turn being characterized by two opposed loops 16 and 17. Heating unit 15 is made of ductile metal lending itself to bending to the desired shape.

In a typical case, heating unit 15 will have a rated capacity of about 2000 watts. It should, however, be operated at a much lower level, perhaps 500 watts, so as to keep the operating temperature well below the maximum that the unit is capable of developing. If in such a case heating unit 15 is operated at its rated capacity, loops 16 and 17 will tend to become caked over, shortening the useful life of the unit. Assuming that, as in FIGURES 1 and 2, loops 16 and 17 are positioned a few inches below liquid level 10, operation of the heating unit at the recommended lower level can nevertheless produce temperatures as high as 150° F. in the top layer of liquid in inlet chamber 6. Although there is some tendency to heat underlying layers by convection, the mass of the liquid in the tank remains at approximately the usual temperature.

Normally the top 4 of tank 1 is three feet or more below ground level. As a result, average temperatures in the tank approach those of the surrounding ground, usually about 50° F. in winter in parts of the country in which there is likely to be snow. Except as the introduction of raw sewage through conduit 7 may momentarily change the temperature in inlet chamber 6, the average temperature is likely to be low enough to interfere seriously with the activity of beneficent bacteria. The failure of these bacteria to act as vigorously as they would if the temperature were considerably higher appears to have a great deal to do with the formation of scum during the fall, winter and spring months.

An installation of the type described may to advantage be operated intermittently rather than continuously, with attendant savings in electricity. Preferably, therefore, heating unit 15 is coupled to controls that bring about energization and de-energization of the unit at appropriate times. Such controls may, for example, consist of a thermostat in inlet chamber 6. Preferred, however, is a control of the nature of a time switch, which in such case may be located outside the tank itself. Experience with installations in which energization and de-energization of the heating elements are effected at regular time intervals indicates that a blanket of dense scum several inches thick extending substantially from one end of the tank to the other can be completely dissipated within two or three weeks' time, after which the installation yields a clear effluent and operates free of objectionable odors.

In FIGURES 4 to 6, inclusive, is shown a modification in which the general arrangement is much the same but in which bracket 21 carries a block 22 of electrical insulating material held in place by screws 23 (FIGURE 6). In this embodiment of the invention, two separate heating units are used, each taking the form of a flat heating coil made up of a plurality of concentric turns. As will be seen from FIGURES 4 and 6, binding posts 24, to which leads from cables 25 and 26 are connected, are coupled to heating coil 27. Similarly, binding posts 28, likewise connected to leads from cables 25 and 26, are coupled to heating coil 29. The latter is similar to but spaced from heating coil 27: see FIGURE 5. Instead of using a plurality of such coils, a single coil formed of a larger number of turns may be used, if desired.

In both embodiments of the invention, electrical energy is converted into heat a short distance below liquid level 10 in tank 1. In both cases, however, the heating units are largely but not entirely immersed in the liquid contents of the tank. Those portions of the heating unit which extend vertically in FIGURES 1 and 2 and the corresponding portions in FIGURES 4 and 5 are above the liquid level; notwithstanding this fact, they supply heat to the interior of the tank. Thus in a sense it may be said that heat is supplied not only to the top layer of liquid in the tank but also to any layer of scum above liquid level 10. If desired, the heating unit or units could be disposed entirely above the level of the liquid, but more efficient operation is obtained by immersing as much as possible of the heating unit in the tank contents just below the air-liquid interface.

The effect of supplying heat to the top few inches of the liquid contents of the tank, especially at the inlet end, appears to be to activate beneficent bacteria in this zone. Inasmuch as numerous experiments have shown that heat supplied over a circumscribed area to the top layers of the liquid contents of the tank dissipates scum even when present elsewhere in the tank in the form of a thick blanket, it is reasonable to assume that the action is such as to favor thermophilic bacteria broadly; however, there is no evidence to indicate that other bacteria are adversely affected. Judging from the absence of odor, from the complete digestion of cellulosic material and from the clear effluent obtained when a septic tank is equipped and operated in accordance with the present invention, there is no impairment of function of other bacterial colonies but an improvement in the overall efficiency of the tank.

It is apparent that within the skill of those versed in the art changes may be made without departing from the concepts of the invention. Heating units of different shape may be used, heating units operating on some other basis than the conversion of electrical energy into heat may be substituted, and the location of the heating unit may be varied, as, for example, by locating it somewhat higher or somewhat lower in inlet chamber 6. The important thing appears to be to supply heat, over a relatively small area, to the top layers of liquid and not to the underlying layers. Heating the latter would greatly increase the cost of operation without any attendant advantage so far as known.

It is intended that the patent shall cover, by summarization in appended claims, all features of patentable novelty residing in the invention.

What is claimed is:
1. In a sewage disposal system employing a tank of the flow-through type that is provided with baffle means in juxtaposition to the inlet, the method of dissipating supernatant scum which comprises activating beneficent bacteria by supplying heat to the contents of the tank, principally the layers which immediately underlie the air-liquid interface, over a circumscribed zone closely adjacent the inlet the lateral extent of which is determined at least in part by the location of the baffle means, the amount of heat so supplied to such circumscribed zone being sufficient to develop in said underlying layers temperatures that are roughly between about 100° and about 150° F. but insufficient to materially affect the temperatures obtaining elsewhere in the tank.

2. A process according to claim 1 wherein the heat is generated in situ.

3. A process according to claim 2 wherein the heating means are energized and de-energized periodically at regular time intervals.

4. Apparatus for dissipating supernatant scum in a sewage disposal tank having an inlet, an outlet and baffle means in juxtaposition to the inlet comprising an access opening extending from the exterior to the interior of the tank; supporting means within the tank, said supporting means being located in a portion of the tank that is accessible through such opening; and, disposed in a circumscribed zone closely adjacent the inlet the lateral extent of which is determined at least in part by the location of the baffle means, heating means carried by the supporting means for dissipating the scum by supplying heat to the beneficent bacteria inhabiting such circumscribed zone, said heating means taking the form of an electrical heating unit of which a major part, but less than all, is submerged in the tank contents within a short distance below the air-liquid interface.

References Cited by the Examiner
UNITED STATES PATENTS

| 1,223,004 | 4/17 | Starr. | |
| 1,505,762 | 8/24 | Barnard. | |
| 1,742,911 | 1/30 | Gutman et al. | 210—532 |
| 1,875,306 | 8/32 | Williams | 219—38.2 |
| 1,929,179 | 10/33 | Piatt | 210—187 XR |
| 2,033,006 | 3/36 | Pruss | 210—175 |
| 2,173,932 | 9/39 | Buckley | 210—532 |

FOREIGN PATENTS 138,655  2/20  Great Britain.

OTHER REFERENCES

Bailey et al.: A Heated Septic Tank for Disposal of Dead Poultry, June 1957, Progress Report 21, a 7 page publication of the Storrs Agricultural Experiment Station College of Agriculture, University of Conn.

MORRIS O. WOLK, *Primary Examiner.*

EARL M. BERGERT, *Examiner.*